United States Patent
Lai

(10) Patent No.: US 8,132,946 B2
(45) Date of Patent: Mar. 13, 2012

(54) AUTOMOBILE HEADLAMP ADJUSTER

(76) Inventor: Ching Tsung Lai, YongKang (TW)

( * ) Notice: Subject to any disclaimer, the term of this patent is extended or adjusted under 35 U.S.C. 154(b) by 315 days.

(21) Appl. No.: 12/607,995

(22) Filed: Oct. 29, 2009

(65) Prior Publication Data
US 2011/0058383 A1    Mar. 10, 2011

Related U.S. Application Data

(60) Provisional application No. 61/241,360, filed on Sep. 10, 2009.

(51) Int. Cl.
*F21V 19/02* (2006.01)
(52) U.S. Cl. .......................... 362/529; 362/289; 362/372
(58) Field of Classification Search .................. 362/287, 362/289, 372, 421, 422, 424, 425, 428, 523, 362/529, 530, 531, 532, 538
See application file for complete search history.

(56) References Cited

U.S. PATENT DOCUMENTS 4,737,891 A * 4/1988 Burton ........................... 362/529
7,284,887 B2 * 10/2007 Fladhammer ................. 362/421

FOREIGN PATENT DOCUMENTS

DE    3841663 A1 *    7/1989
* cited by examiner

*Primary Examiner* — Y My Quach Lee
(74) *Attorney, Agent, or Firm* — Alexander Chen, Esq.

(57) ABSTRACT

An adjusting apparatus for an automobile headlight or similarly situated work piece comprising a housing with a first opening and a second opening, a thread-less drive shaft extending through said top opening and having one end having a drive shaft connector connected via a first stop bolt to a first end of a pivot arm and the second end of said drive shaft for connection with said automobile headlight, a threaded input shaft extending through said second opening engaging an input shaft mounting bracket with a threaded portion of said threaded input shaft wherein said input shaft mounting bracket is further connected via a second stop bolt to a second end of said pivot arm, wherein said pivot arm is secured to said housing via a central pivot bolt, wherein a rotational adjustment of said input shaft will alter the position of said input shaft mounting bracket thereby altering the position of said second end of said pivot arm thereby altering the position of said first end of said pivot arm thereby causing said drive shaft to move forward or backward, wherein said input shaft mounting bracket engages said threaded portion of said input shaft as to prevent undesired movement of said drive shaft.

20 Claims, 5 Drawing Sheets

AUTOMOBILE HEADLAMP ADJUSTER

CROSS-REFERENCE TO RELATED APPLICATIONS

This application claims the benefit of priority under 35 U.S.C. 119(e) to the filing date of U.S. provisional patent application No. 61/241,360 entitled "Headlamp adjuster" which was filed Sep. 10, 2009, and is incorporated herein by reference.

FIELD OF THE INVENTION

The present invention relates generally to a vehicular lighting device adjustment mechanism. Specifically, the present invention is related to an adjustment mechanism for a headlamp or similar vehicular lighting device, where the device contains an axis with a central pivot point and an adjustment shaft without thread.

BACKGROUND OF THE INVENTION

The present invention relates to adjusting mechanism for controlling linear movement along one axis for actuating relatively light loads such as vehicular headlamps or similar vehicular lighting assemblies. Particularly, the invention relates to an improved assembly and construction of such mechanisms with increased efficiency and fault tolerance when utilized for adjusting vehicular headlamps to bring about a change in the direction and shape of the light beam.

As modern vehicles have evolved towards more aerodynamic shape, headlight design, construction, and placement has followed suit as seen by the shift from mounting headlamps on the exterior of the vehicle into the interior of the engine compartment, enclosed in modular form. Headlights are now designed in a manner such that the lens structure smoothly follows the contour of the vehicle's body. Moving the headlights into an enclosed compartment within the chassis serves to smooth the aerodynamic shape and reduce the drag profile of the vehicle thereby improving efficiency of the vehicle itself. In order to properly project the light beam at the correct strength and angle, the structure attaching the headlight to the chassis of the vehicle must be adjustable.

With modern emphasis on drag profile reduction, aerodynamic design and its corresponding increase in efficiency, the methods and apparatus found in prior arts are impractical and inefficient. In the past, adjustment of the vehicular headlights necessitated the dismantling of the forward exterior, often requiring specialized tools and a specific knowledge of the design of the vehicle's chassis. Such a cumbersome approach is to be avoided as it increases the cost of maintenance to the vehicle's owner whom would be forced to either purchase specific tools or employ the services of a trained mechanic.

Modular headlights have overcome such limitations through rudimentary adjusters that permit the adjustment of vehicular headlights while installed within the interior of the vehicle's chassis without requiring the removal of the entire headlight structure or alteration of the chassis.

OBJECT OF THE INVENTION

It is an object of this invention to create an adjuster apparatus, where the adjuster contains an interrelated axis with central pivot point to adjust the adjustment shaft without having the need to use thread on the adjustment shaft. The present invention relates to adjusting mechanism for automobile headlamps or the like, and more particularly relates to improved assembly and construction of such mechanism.

It is an object of this invention to create an adjuster apparatus for headlamp adjustment, where the adjuster contains significantly less components so as to reduce production cost and to increase its durability.

This is a critical advantage to increase adjuster's durability because if the adjuster fails due to poor designing as to contain too many complicated parts, the headlamp of the vehicle will not align right during the duration of its usage. If the vehicle headlamp does not align right, depending on the angles of misalignment, the projected light beam could either not create sufficient light to illuminate the road for the vehicle, or it could misaligned in a way that it illuminate light beam to opposing traffic. Either way, such failure of adjuster causes significant danger to public traffic safety and public welfare, It is further an object of this invention to create an adjuster apparatus for headlamp adjustment, where the adjuster is substantially cost effective to produce and thereby reducing the overall cost of the headlamp.

SUMMARY OF THE INVENTION

The invention describes an apparatus for adjusting the headlamp unit through the manipulation of two interconnected adjustment shafts without the necessity for use of thread on the adjustment shafts. A shell, made of plastic or metal, houses two shafts, the thread-less input shaft and the drive shaft. A hinge is attached to each shaft, which connects both shafts together via a central pivot point. Physical manipulation of said input shaft alters the length of the drive shaft protruding from the housing. When installed into a vehicle headlamp unit, the drive shaft manipulates the position of the headlamp within its enclosure. Manipulation of the input shaft correlates with a change in position and orientation of the headlamp attached to the drive shaft.

In one embodiment, both shafts are oriented in parallel to one another. The advantage of such an orientation is that the foot print of the headlamp adjustment mechanism is reduced as compared to other devices of similar function which require both shafts to be perpendicular to one another due to the limitations of such a configuration that uses threaded drive and input shafts.

In one embodiment, the drive shaft is thread-less. The use of a threadless drive shaft increases the fault tolerance of such a headlamp adjustment device. Threaded adjustment shafts suffer from jamming due to wear and tear upon the threads as a result of the constant friction between the threads. In addition, the accumulation of debris on the threads also leads towards undesirable jamming issues. With constant exposure to weather patterns of the natural world, vehicles benefit from devices which are capable of withstanding the deleterious effects of weather.

The present invention provides better fault tolerance and improved efficiency over other similar devices. In addition, the current invention requires no dismantling of the front interior of the vehicle, necessitates no special tools, and does not require technicians to have a specific knowledge of the vehicle's chassis.

In one embodiment, an adjusting apparatus for an automobile headlight or similarly situated work piece is disclosed comprising a housing with a first opening and a second opening; a thread-less drive shaft extending through said top opening and having one end having a drive shaft connector connected via a first stop bolt to a first end of a pivot arm and the second end of said drive shaft for connection with said automobile headlight, a threaded input shaft extending through said second opening engaging an input shaft mounting bracket with a threaded portion of said threaded input shaft wherein said input shaft mounting bracket is further connected via a second stop bolt to a second end of said pivot arm, wherein said pivot arm is secured to said housing via a central pivot bolt, wherein a rotational adjustment of said input shaft will alter the position of said input shaft mounting bracket thereby altering the position of said second end of said pivot arm thereby altering the position of said first end of said pivot arm thereby causing said drive shaft to move forward or backward, wherein said input shaft mounting bracket engages said threaded portion of said input shaft as to prevent undesired movement of said drive shaft.

In one embodiment, the undesired movement is a refraction of said drive shaft or is an extension of said drive shaft. In one other embodiment, the housing is molded plastic or molded metal. In one embodiment the central pivot bolt is located at approximately center of said pivot arm or at the center of said pivot arm. In another embodiment, the central pivot bolt is located around the first end of said pivot arm or around the second end of said pivot arm. In a preferred embodiment the drive shaft is positioned parallel to said input shaft.

In another aspect of the invention, a method to adjust an automobile headlight or similarly situated workpiece is disclosed comprising having a housing with a first opening and a second opening; having a thread-less drive shaft extending through said top opening and having one end having a drive shaft connector connected via a first stop bolt to a first end of a pivot arm and the second end of said drive shaft for connection with said automobile headlight; having a threaded input shaft extending through said second opening engaging an input shaft mounting bracket with a threaded portion of said threaded input shaft wherein said input shaft mounting bracket is further connected via a second stop bolt to a second end of said pivot arm; wherein said pivot arm is secured to said housing via a central pivot bolt; wherein a rotational adjustment of said input shaft will alter the position of said input shaft mounting bracket thereby altering the position of said second end of said pivot arm thereby altering the position of said first end of said pivot arm thereby causing said drive shaft to move forward or backward thereby altering the movement of said automobile headlight; wherein said input shaft mounting bracket engages said threaded portion of said input shaft as to prevent undesired movement of said drive shaft.

DETAILED DESCRIPTION OF THE EMBODIMENT

Figure 1:
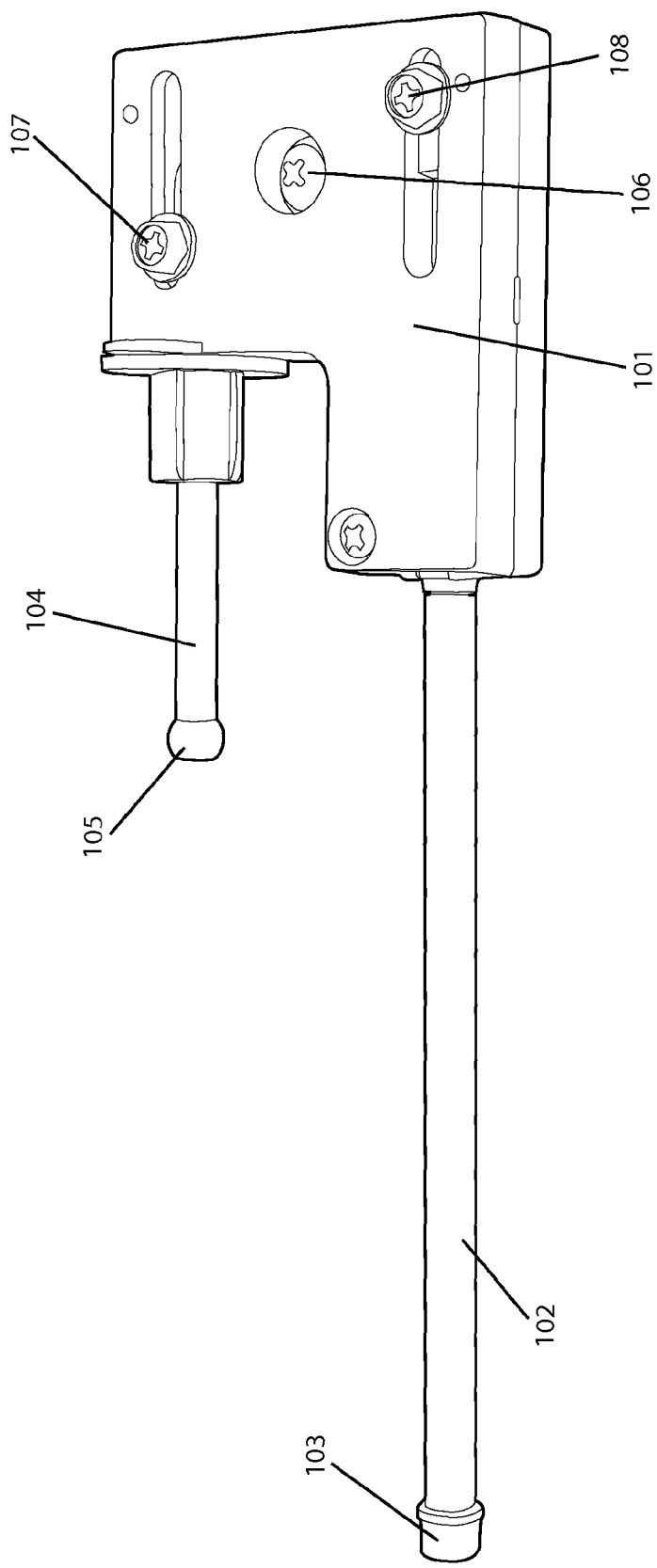
FIG. 1 is a side elevation of an embodiment of the present invention

Referring to FIG. 1, there is a housing, reference character 101, containing all other parts, either partially or wholly. The longer input shaft, 102, terminates in a shaped tip suitable for attachment to adjusting tools such as Phillips head screw driver, 103. The shorter drive shaft, 104, is fitted with an alternative tip 105, suitable for attachment to an automobile headlamp. Also visible is the central pivot bolt, 106, whose additional functions will be described later, but also serves to attach the two halves of the housing here. Heads of two stop bolts are visible and are labeled 107 (the first stop bolt) and 108 (the second stop bolt). There is one stop bolt for each shaft. These may be adjusted by means of a common Phillips head screwdriver. They tighten against the housing and prevent unwanted movement of the two shafts. The parallel placement of the two shafts reduces the footprint of the adjustment device when compared to other such devices in the prior art.

Figure 2:
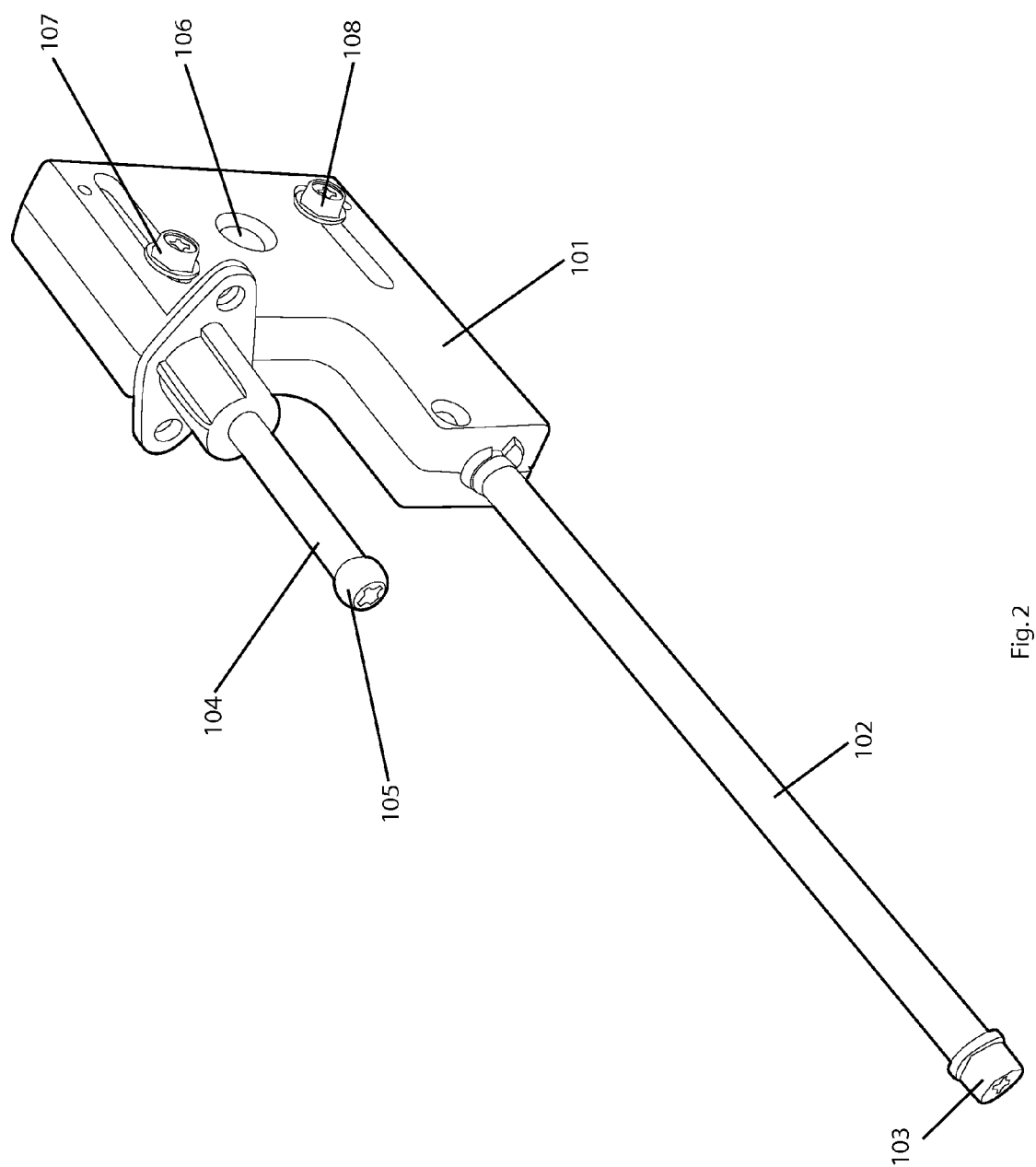
FIG. 2 is a perspective view of the top of an embodiment of the present invention

Now referring to FIG. 2, the end tips of input 103, 105 and drive shafts are revealed. The ball-type shape of the drive shaft tip, 105 is more cylindrical and must be more precisely inserted in the appropriate mounting point on the automobile headlamp. The input shaft tip, 103, allows for easier insertion and adjustment of that shaft from any angle. Also visible is the mounting plate for this embodiment of the invention. This plate is part of the housing, 101, and allows the invention to be attached to an appropriate fixed mounting point in the automobile's headlight compartment.

Figure 3:
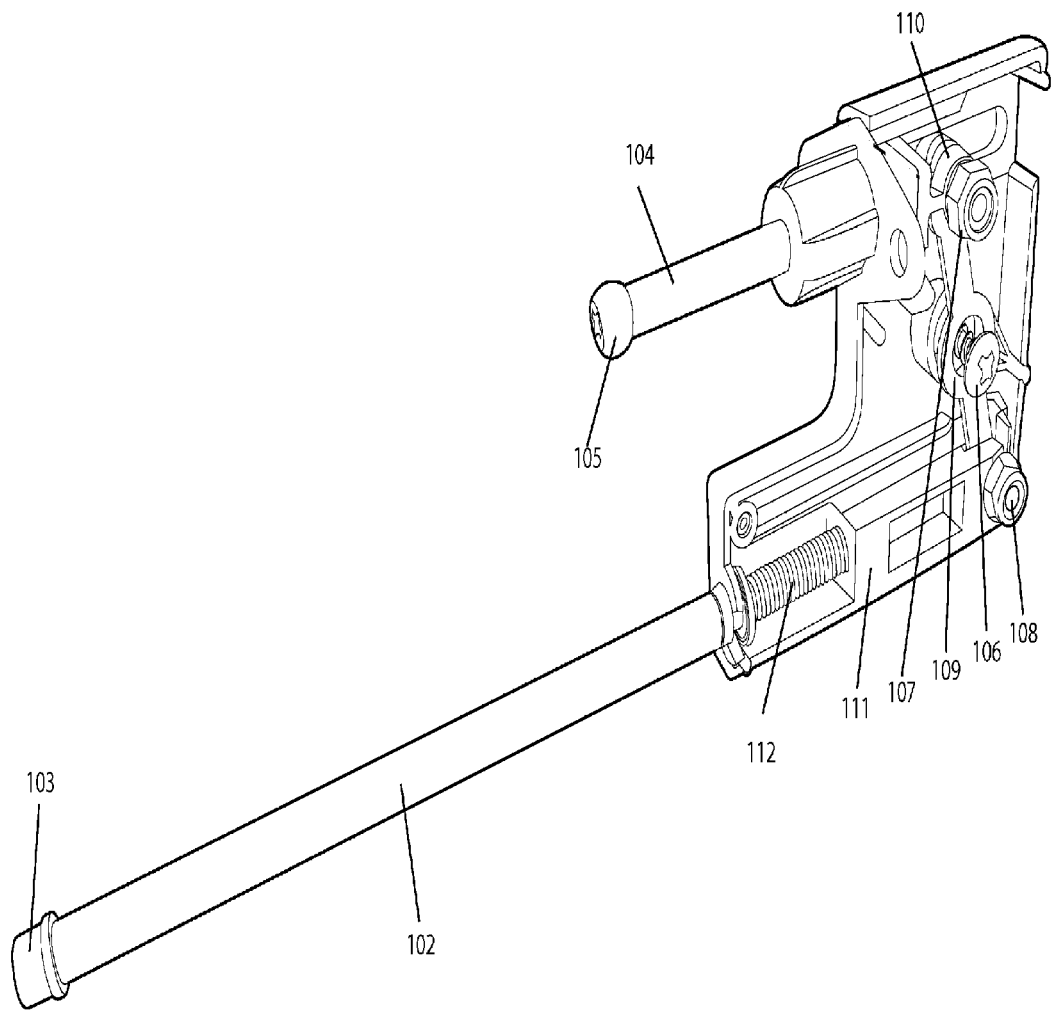
FIG. 3 is a perspective cutaway view of the preferred embodiment of the present invention

Now referring to FIG. 3, a cutaway perspective, the internal components of the invention are revealed. A central pivot bolt, reference character 106, is attached to the housing to provide stability to the pivot bolt. Attached to the pivot bolt is a pivot arm, 109. The ends of the pivot are each attached to stop bolts, 108. In turn, these bolts 107 are secured inside the housing by standard nuts. The stop bolts are placed in slot tracks cut in the housing, reference character 101 in FIG. 1. The tracks fix the stop bolts so that they may travel only along the longitudinal axis of the shafts to which they are attached. The stop bolts are attached to the input and drive shafts by means of two differently shaped mounting brackets. The drive shaft mounting bracket, 110, is shaped so that it will stop forward movement of the stop bolt along the housing track by coming into flush contact with the inside of the housing when the stop bolt is sufficiently far forward. The mounting bracket 111 for the stop bolt moving along the input shaft axis features a hollow shape that allows the input shaft to move inside housing. In one embodiment, the drive shaft has a collar that allows the input shaft to turn without wearing on or binding up with the housing. The mounting bracket 111 attaches to the input shaft by encasing it with a threaded portion that interacts with the threaded portion of the input shaft. As the input shaft turns clockwise, the mounting bracket 111 moves toward rear of the housing, thereby pushing the drive shaft forward via the pivot arm. The ends 105 of the drive shaft is attached to an automobile headlamp. The stop bolts, when loosened and moved along the tracks, simultaneously allows the pivot arm to moves the drive shaft along the longitudinal axis and spins the input shaft depending on the motion of the stop bolt as described above. The movement of mounting bracket 111 causes the movement of mounting bracket 110 via the pivot arm 109 in a push-pull manner to adjust the automobile headlamp in the chosen manner. One invention may be used to adjust the headlamp in the vertical direction and another for adjustment in the horizontal direction. Automobile headlamps, when installed, rarely illuminate the path of the vehicle as designed. Almost all require some amount of adjustment.

Figure 4:
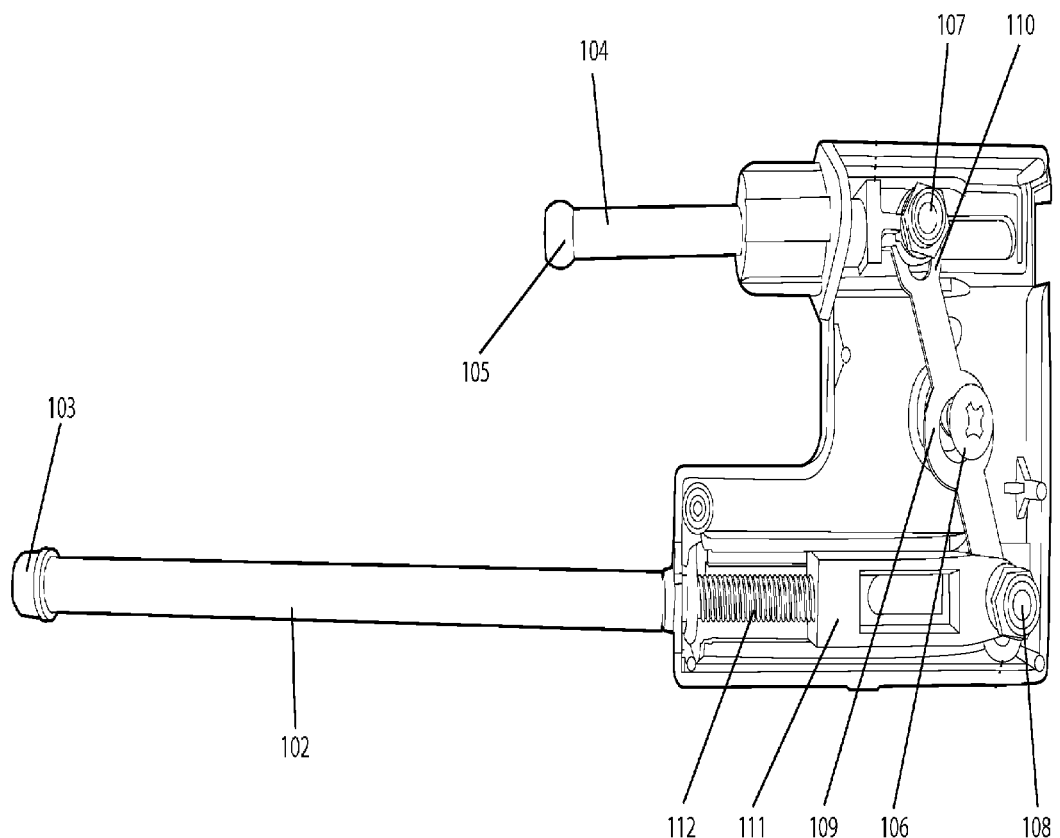
FIG. 4 is a side elevation cutaway view of the preferred embodiment of the present invention with the top adjusting rod moved completely forward and be bottom adjusting rod adjusted completely to the rear
Figure 5:
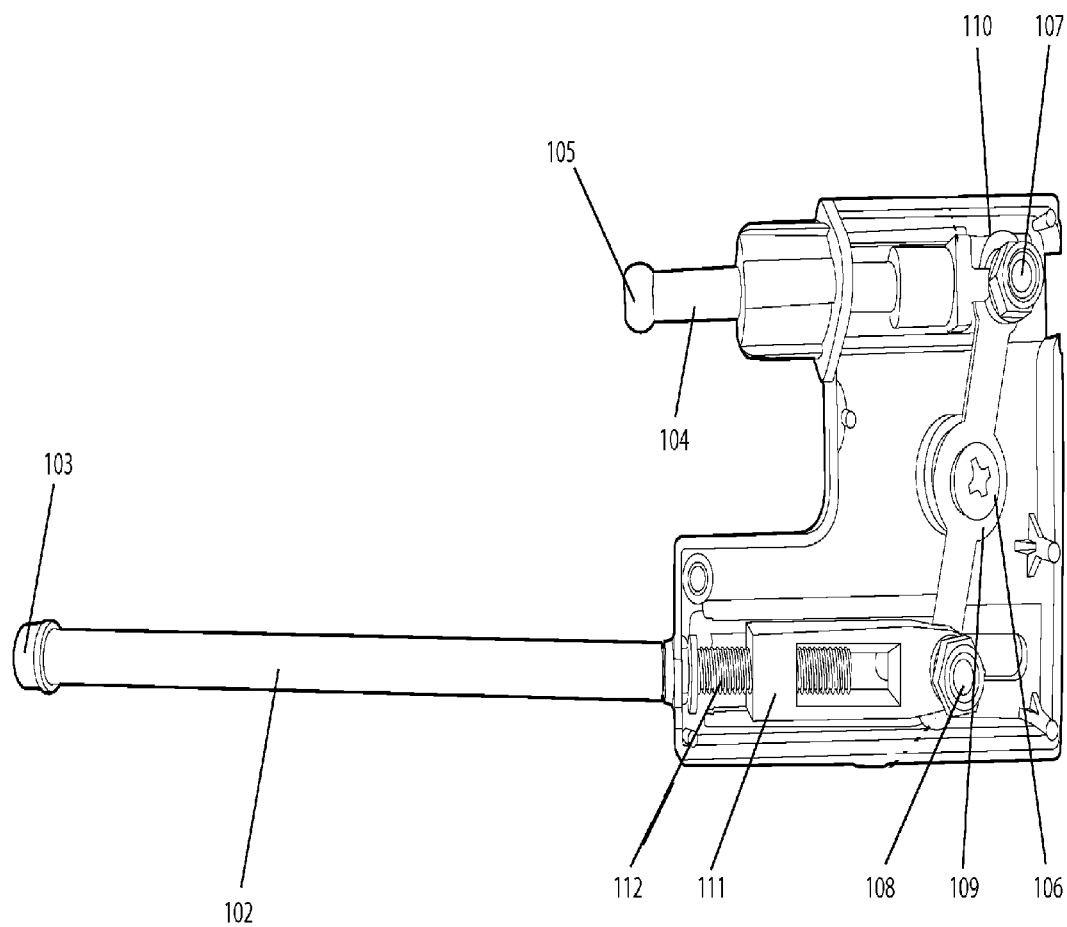
FIG. 5 is a side elevation cutaway view of the preferred embodiment of the present invention with the top adjusting rod adjusted completely to the rear and the bottom adjusting rod all the way forward.

Now referring to FIGS. 4 and 5, the drive shaft, 104, is extended to full length in FIG. 4 and refracted to the maximum amount in FIG. 5. These figures also illustrate the movement of the mounting bracket 111 along and around the input shaft 102 with respect to its threaded portion 112. It can be seen that the input shaft 102 does not extend or retract, but does rotate around its longitudinal axis thereby moving the mounting bracket 111. The threaded portion 112 of the shaft moves the threaded end of the mounting bracket 111 as the input shaft is turned on its longitudinal axis.

I claim:

1. An adjusting apparatus for an automobile headlight or similarly situated work piece comprising: A housing with a first opening and a second opening; a thread-less drive shaft extending through said first opening and having one end having a drive shaft connector connected via a first stop bolt to a first end of a pivot arm and the second end of said drive shaft for connection with said automobile headlight; a threaded input shaft extending through said second opening engaging an input shaft mounting bracket with a threaded portion of said threaded input shaft wherein said input shaft mounting bracket is further connected via a second stop bolt to a second end of said pivot arm; wherein said pivot arm is secured to said housing via a central pivot bolt; wherein a rotational adjustment of said input shaft will alter the position of said input shaft mounting bracket thereby altering the position of said second end of said pivot arm thereby altering the position of said first end of said pivot arm thereby causing said drive shaft to move forward or backward; wherein said input shaft mounting bracket engages said threaded portion of said input shaft as to prevent undesired movement of said drive shaft.

2. The adjusting apparatus of claim 1 wherein said undesired movement is a retraction of said drive shaft.

3. The adjusting apparatus of claim 1 wherein said undesired movement is an extension of said drive shaft.

4. The adjusting apparatus of claim 1 wherein said housing is molded plastic.

5. The adjusting apparatus of claim 1 wherein said housing is molded metal.

6. The adjusting apparatus of claim 1 wherein said central pivot bolt is located at approximately center of said pivot arm.

7. The adjusting apparatus of claim 1 wherein said central pivot bolt is located at the center of said pivot arm.

8. The adjusting apparatus of claim 1 wherein said central pivot bolt is located around the first end of said pivot arm.

9. The adjusting apparatus of claim 1 wherein said central pivot bolt is located around the second end of said pivot arm.

10. The adjusting apparatus of claim 1 wherein said drive shaft is positioned parallel to said input shaft.

11. A method to adjust an automobile headlight or similarly situated workpiece comprising: having a housing with a first opening and a second opening; having a thread-less drive shaft extending through said first opening and having one end having a drive shaft connector connected via a first stop bolt to a first end of a pivot arm and the second end of said drive shaft for connection with said automobile headlight; having a threaded input shaft extending through said second opening engaging an input shaft mounting bracket with a threaded portion of said threaded input shaft wherein said input shaft mounting bracket is further connected via a second stop bolt to a second end of said pivot arm; wherein said pivot arm is secured to said housing via a central pivot bolt; wherein a rotational adjustment of said input shaft will alter the position of said input shaft mounting bracket thereby altering the position of said second end of said pivot arm thereby altering the position of said first end of said pivot arm thereby causing said drive shaft to move forward or backward thereby altering the movement of said automobile headlight; wherein said input shaft mounting bracket engages said threaded portion of said input shaft as to prevent undesired movement of said drive shaft.

12. The method of claim 11 wherein said undesired movement is a retraction of said drive shaft.

13. The method of claim 11 wherein said undesired movement is an extension of said drive shaft.

14. The method of claim 11 wherein said housing is molded plastic.

15. The method of claim 11 wherein said housing is molded metal.

16. The method of claim 11 wherein said central pivot bolt is located at approximately center of said pivot arm.

17. The method of claim 11 wherein said central pivot bolt is located at the center of said pivot arm.

18. The method of claim 11 wherein said central pivot bolt is located around the first end of said pivot arm.

19. The method of claim 11 wherein said central pivot bolt is located around the second end of said pivot arm.

20. The method of claim 11 wherein said drive shaft is positioned parallel to said input shaft.

* * * * *